Patented June 19, 1951

2,557,520

UNITED STATES PATENT OFFICE 2,557,520

PESTICIDAL COMPOSITIONS COMPRISING AN ALKYL ARYL SULFIDE

Davis A. Skinner, Compton, and Elvin L. Wampler, Anaheim, Calif., assignors to Union Oil Company of California, Los Angeles, Calif., a corporation of California No Drawing. Application February 18, 1949, Serial No. 77,278

5 Claims. (Cl. 167—30)

This invention relates to pest control, and in particular concerns improved methods and compositions for arresting or preventing the growth of insects and other organisms which are economically and physiologically undesirable. More particularly, it relates to pest control methods and compositions involving the use of certain alkyl aryl sulfides as toxic agents. The term "pest control" is employed herein as a generic expression including such terms as insecticide, fungicide, aphicide, larvicide, vermicide, pesticide and the like.

The alkyl aryl sulfides which are employed as active agents in the control of pests in accordance with the invention are alkyl 2,4-dinitrophenyl sulfides or alkyl 2-nitro-4-halophenyl sulfides. These compounds may be represented generically by the formula:

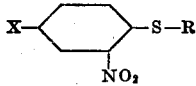

wherein R represents an alkyl group and X represents a substituent selected from the class consisting of halogen and nitro groups. The alkyl 2,4-dinitrophenyl sulfides are conveniently obtained by reaction between a 2,4-dinitro-halobenzene, such as 2,4-dinitro-chlorobenzene and an alkyl mercaptan, such as isobutyl mercaptan, in the form of its sodium or other alkali-metal salt. The alkyl 2-nitro-4-halophenyl sulfides are similarly obtained by reaction between a 2,5-dihalo-nitrobenzene, such as 2,5-dichloro-nitrobenzene and an alkali-metal alkyl mercaptide. In either case the reaction is usually carried out in the presence of an inert solvent, such as methanol or ethanol, and is readily effected at normal or only slightly elevated temperatures, e. g., below about 100° C. Upon completion of the reaction, the crude product is usually washed with water and may be further purified by crystallization or fractional distillation under vacuum.

The alkyl aryl sulfide toxic agents of the invention may also be otained by reaction between 2,4-dinitro-thiophenol or a 2-nitro-4-halo-thiophenol and alkyl halides.

The following examples will illustrate the preparation of a number of the akyl aryl sulfides of the present class but are not to be construed as limiting the invention. All proportions are given in parts by weight.

Example 1

An alcoholic solution of sodium n-propyl mercaptide was prepared by dissolving 1950 parts of n-propyl mercaptan in an alcoholic caustic soda solution obtained by dissolving 700 parts of sodium hydroxide in 1800 parts of 50% aqueous methanol. This solution was then added slowly with stirring to a solution of 3550 parts of 2,4 - dinitro - chlorobenzene dissolved in 10,400 parts of methanol while maintaining a reaction temperature of 50°–55° C. Stirring was continued for several hours to insure completion of the reaction, after which the mixture was allowed to cool whereupon a mass of orange-colored crystals separated out of solution. The crystalline product was filtered off and washed with a small quantity of cold methanol, and was then slurried with water, filtered and dried. There was thus obtained 38.5 parts of n-propyl 2,4-dinitrophenyl sulfide as an orange-colored crystalline product having a melting point of about 83°–84° C.

Example 2

An aqueous solution of sodium methyl mercaptide was prepared by saturating a 14% aqueous caustic soda solution with methyl mercaptan. This solution was then added slowly with stirring to 5000 parts of 2,5-dichloro-nitrobenzene dissolved in 5200 parts of ethanol and contained in a flask fitted with a reflux condenser. Sufficient of the mercaptide solution was employed to provide an excess of about 10%. As the reaction proceeded, the temperature rose from 50° C. to reflux temperature while a voluminous precipitate of the sulfide product settled out of solution. The mixture was stirred at reflux temperature for about one hour after completion of the addition of the mercaptide solution, after which it was cooled to about 16° C. and diluted with about 21,000 parts of water. The crystalline product which precipitated was filtered off and washed several times with cold ethanol, and finally was dried overnight at 90° C. There was obtained 4195 parts of methyl 2-nitro-4-chlorophenyl sulfide as a deep yellow crystalline product having a melting point of about 129°–130° C.

Example 3

Approximately 1750 parts of sec.-butyl mercaptan were dissolved in a solution of 703 parts of sodium hydroxide in 1800 parts of water. This solution was then added in a thin stream over a period of 3.5 hours to a solution of 3550 parts of 2,4-dinitro-chlorobenzene in about 8500 parts of methanol while maintaining the mixture at a reaction temperature of about 55° C. by means of a water bath surrounding the reaction vessel. During the addition of the mercaptide solution the reaction mixture became bright orange in color and an orange-colored oil separated out of solution. Upon completion of the reaction the oil was separated from the supernatant alcoholic layer and was washed several times with water. Upon standing overnight the washed product solidified to an orange-colored crystalline mass of crude sec.-butyl 2,4-dinitrophenyl sulfide having a melting point of 59°–61° C. A small portion of this product was purified by recrystallization from toluene solution and was found to have a melting point of about 65.5° C.

By procedures identical with those employed in the foregoing examples, a wide variety of alkyl aryl sulfide compounds of the present class may be prepared. As examples of such compounds there may be mentioned:

Methyl 2,4-dinitrophenyl sulfide
Ethyl 2,4-dinitrophenyl sulfide
Iso-propyl 2,4-dinitrophenyl sulfide
n-Butyl 2,4-dinitrophenyl sulfide
Iso-butyl 2,4-dinitrophenyl sulfide
Tert.-butyl 2,4-dinitrophenyl sulfide
n-Amyl 2,4-dinitrophenyl sulfide
Iso-amyl 2,4-dinitrophenyl sulfide
n-Hexyl 2,4-dinitrophenyl sulfide
n-Octyl 2,4-dinitrophenyl sulfide
Tert.-octyl 2,4-dinitrophenyl sulfide
Decyl 2,4-dinitrophenyl sulfide
Dodecyl 2,4-dinitrophenyl sulfide
Hexadecyl 2,4-dinitrophenyl sulfide
Octadecyl 2,4-dinitrophenyl sulfide
Ethyl 2-nitro-4-chlorophenyl sulfide
n-Propyl 2-nitro-4-chlorophenyl sulfide
n-Butyl 2-nitro-4-chlorophenyl sulfide
Octyl 2-nitro-4-chlorophenyl sulfide
Decyl 2-nitro-4-chlorophenyl sulfide
Methyl 2-nitro-4-bromophenyl sulfide
Iso-butyl 2-nitro-4-bromophenyl sulfide
n-Amyl 2-nitro-4-bromophenyl sulfide
Heptyl 2-nitro-4-bromophenyl sulfide
Nonyl 2-nitro-4-bromophenyl sulfide
Dodecyl 2-nitro-4-bromophenyl sulfide
Octadecyl 2-nitro-4-bromophenyl sulfide Any of such compounds as well as their homologs and analogs may be employed as active ingredients in the control of pests according to the invention. For reasons of economy and ease of preparation, however, the lower alkyl compounds, i. e., those in which the alkyl group contains from 1 to 7 carbon atoms, are preferred.

The alkyl aryl sulfide products prepared as described above may be employed in various ways in the control of pest organisms. These products are high-boiling liquids or crystalline solids and are hence well suited for outdoor use in orchard or garden sprays or in dusting compositions since they do not readily evaporate. Spray compositions may take the form of simple solutions or suspensions of the toxic agent in a non-phytotoxic solvent such as spray oil. More usually, however, such compositions are formulated as aqueous emulsions or suspensions which may contain a wide variety of emulsifying, wetting, or dispersing agents, sticking agents, spreaders, diluents, and secondary toxic agents in addition to the alkyl aryl sulfide product. Any of the known procedures for preparing such compositions may be employed, and any of the various known wetting agents, speaders, etc. may be employed in their formulation. In accordance with usual practice, the compositions are conveniently prepared and marketed in concentrate form which can be admixed with water at any desired time to form the ultimate spray composition. Such a composition may comprise, for example, the toxic agent intimately admixed with 0.1 per cent by weight of the sodium salts of mixed sulfated higher alcohols. Upon mixing one part by weight of such composition with 99 parts by weight of water there is obtained an effective insecticidal spray of 1 per cent concentration. Such composition may also contain sticking agents, spreaders, and other commonly employed addition agents. Inasmuch as the toxic agent may comprise a mixture of liquid and solid components, it is often convenient to employ the same in the form of a concentrated solution in an organic solvent, e. g., benzene or acetone, when preparing various insecticidal compositions.

The alkyl aryl sulfide toxic agents may also be admixed with active or inert carriers, e. g., talc, starch, aluminum silicate, walnut shell flour, etc., to form insecticidal dusting compositions which may also contain other toxic agents such as sulfur, DDT, pyrethrins, nicotine derivatives, p-dichlorobenzene, etc. Similarly, they may be employed in cattle sprays and the like in conjunction with other toxic agents such as pyrethrins or rotenone, synergists, active or inert solvent, aerosols, etc.

The following examples will illustrate the formulation of a number of pest control compositions employing the herein described alkyl aryl sulfide products as the primary toxic agent, but are not to be construed as limiting the invention.

*Example 4*

| | Pounds |
|---|---|
| n-Propyl 2,4-dinitrophenyl sulfide | 3.75 |
| Attapulgus clay | 1.25 |
| Powdered aluminum silicate | 70.0 |

The toxic agent and clay are thoroughly mixed in a ball-mill, and the mixture is then blended into the powdered aluminum silicate.

*Example 5*

| | | |
|---|---|---|
| Sec.-butyl 2-nitro-4-chlorophenyl sulfide | pounds | 5 |
| Attapulgus clay | do | 10 |
| Powdered blood albumin | ounces | 4 |
| Water | gallons | 100 |

The toxic agent and clay are intimately mixed in a ball-mill and then added with thorough agitation to the water in which the blood albumin has previously been dispersed.

*Example 6*

| | | |
|---|---|---|
| Iso-butyl 2-nitro-4-chlorophenyl sulfide | pounds | 1.0 |
| Powdered blood albumin | ounces | 4 |
| Water | gallons | 100 |

The blood albumin is stirred into the water and the toxic agent then added with thorough agitation.

*Example 7*

| | | |
|---|---|---|
| Iso-propyl 2,4-dinitrophenyl sulfide | pounds | 0.5 |
| Benzene | do | 1.0 |
| Powdered blood albumin | ounces | 4 |
| Water | gallons | 100 |

The toxic agent is dissolved in the benzene, and the resulting solution is stirred into the water in which the blood albumin has previously been dispersed.

Example 8

| | | |
|---|---|---|
| n-Hexyl 2,4-dinitrophenyl sulfide | pounds | 1.0 |
| Petroleum naphtha | do | 20 |
| 5% aqueous spray oil emulsion | gallons | 100 |

The toxic agent is dissolved in the naphtha and then stirred into the aqueous oil emulsion.

Example 9

| | | |
|---|---|---|
| Mixed amyl 2,4-dinitrophenyl sulfide | pounds | 2.0 |
| Attapulgus clay | do | 2.5 |
| Kerosene | do | 1.0 |
| Commercial spreading agent ("Ortho" dry) | pounds | 0.5 |
| Water | gallons | 100 |

The toxic agent and clay are mixed by ball-milling, and the spreading agent is suspended in the kerosene. These two compositions are then stirred into the water.

Example 10

| | | |
|---|---|---|
| Ethyl 2-nitro-4-bromophenyl sulfide | pounds | 1.0 |
| Talc | do | 1.0 |
| Cane sugar | pounds | 4.0 |
| Commercial spreading agent (Leffingwell "DO") | ounces | 4 |
| Commercial spreading agent (Leffingwell "DO") | pounds | 2 |
| Water | gallons | 100 |

The toxic agent and talc are thoroughly admixed, and then stirred into the water in which the cane sugar, spreading agent and sticking agent have previously been dispersed.

The alkyl aryl sulfide toxic agents may also be admixed with active or inert carriers, e. g., talc, starch, aluminum silicate, walnut shell flour, etc., to form insecticidal dusting compositions which may also contain other toxic agents such as sulfur, DDT, pyrethrins, nicotine derivatives, p-dichlorobenzene, etc. Similarly, they may be employed in cattle sprays and the like in conjunction with other toxic agents such as pyrethrins or rotenone, synergists, active or inert solvents, aerosols, etc.

The following examples will illustrate the use of a number of the toxic agents of the present class in the control of various pest organisms in various ways, but are not to be construed as limiting the invention.

Example 11

Several of the alkyl aryl sulfides of the present class were tested for fungistatic action on the spores of *Sclerotina fructicola*. In carrying out the tests, the toxic agent was dispersed in a dilute sugar solution in a concentration twice that desired for the test. The dispersion was then mixed with an equal volume of a nutrient broth culture of the test organism spores. After 24 hours the culture was examined under the microscope and an actual count was made to determine the proportion of germinating spores. The results of these tests are tabulated as follows:

| Test Compound | Percentage of Spores Germinating at Concentrations of— | | | | | |
|---|---|---|---|---|---|---|
| | 0.1 | 0.05 | 0.025 | 0.0125 | 0.01 | 0.005 |
| n-Propyl 2,4-dinitrophenyl sulfide | 0 | 0 | 0 | | 0 | 1.5 |
| iso-Propyl 2,4-dinitrophenyl sulfide | 0 | 0 | | | 1.5 | |
| sec.-Butyl 2,4-dinitrophenyl sulfide | | | 0 | | 1.5 | |
| iso-Butyl 2,4-dinitrophenyl sulfide | 0 | 0 | 0 | 0 | 0 | 0 |
| Methyl 2,4-dinitrophenyl sulfide | 0 | 0 | 0 | 0 | 0 | 1-5 |
| sec.-Butyl 2-nitro-4-chlorophenyl sulfide | | | | 1.5 | | |

Example 12

The phytotoxic effect of a number of the alkyl aryl sulfides of the present class with respect to tomato, squash, and chard plants was determined by spraying a healthy young plant with a 1 per cent aqueous suspension of the toxic agent. Seven days after treatment the plants were examined and the following conditions noted:

| Toxic Agent | Plant Condition | | |
|---|---|---|---|
| | Tomato | Squash | Chard |
| n-Propyl 2,4-dinitro-phenyl sulfide | No injury | No injury | No injury. |
| iso-Propyl 2,4-dinitro-phenyl sulfide | do | do | Do. |
| sec.-Butyl 2,4-dinitro-phenyl sulfide | Slight injury, no necrosis | Slight injury, no necrosis | Slight spotted necrosis. |
| Ethyl 2,4-dinitrophenyl sulfide | Slight spotted necrosis | No injury | Slight injury, no necrosis. |
| Ethyl 2-nitro-4-chlorophenyl sulfide | Slight injury, no necrosis | Slight spotted necrosis | Do. |

Example 13

A dusting type insecticide was prepared by mixing equal parts of powdered ethyl 2,4-dinitrophenyl sulfide with finely-divided talc. Sections of corn blade were thoroughly dusted with this composition and were then placed in a petri dish containing armyworm larvae (*Cirphus unipuncta*). Twenty-four hours later, a larvae count showed a mortality of greater than 50 per cent as compared with a control mortality of less than 10 percent. A similar test carried out with methyl 2,4-dinitrophenyl sulfide showed that this compound likewise secured a mortality of better than 50 per cent.

Example 14

A suspension of 1 part of ethyl 2,4-dinitrophenyl sulfide in 100 parts of water was applied to ripe oranges and allowed to dry. The oranges were then placed in containers containing adult greenhouse thrips (*Heliothrips haemorrhoidalis*). Twenty-four hours later an examination of the oranges showed that a thrip mortality of greater than 90 per cent had been secured.

Example 15

Thirty-eight parts of sec.-butyl 2,4-dinitrophenyl sulfide were dissolved in about 80 parts of benzene, and the resulting solution was dispersed in water with the aid of a small quantity of powdered blood albumin. The dispersion so obtained contained 1.5 pounds of the active ingredient per 100 gallons. Four ounces of a commercial spreading agent (Leffingwell "DO") and one quart of a commercial sticking agent (Leffingwell "DO") were then added, and the dispersion was applied to nine-tree plots of lemon trees infested with citrus thrips (*Scirtothrips citri*). Application was made with a three-nozzle boom power sprayer at the rate of about 3.85 gallons per tree. One week after treatment, 36 representative terminals in each plot were examined and the number of living thrips counted. It was found that an average of 9.0 thrips per 36 terminals were present on the treated trees as compared with a control count of 180 thrips per 36 terminals.

Methyl 2-nitro-4-chlorophenyl sulfide was tested for control of citrus thrips in the same manner except that the concentrate employed in preparing the aqueous dispersion comprised equal parts of the active agent and talc rather than a benzene solution of the active agent. This product gave a thrip count of 27.0 thrips per 36 terminals as compared with the control count of 180.

n-Propyl 2,4-dinitrophenyl sulfide was tested for the control of citrus thrips in the same manner. It was found to give an average thrip count of 3.85 thrips per 36 terminals as compared with the control count of 180.

Example 16

Fifty parts of sec.-butyl 2,4-dinitrophenyl sulfide were dissolved in about 80 parts of benzene and the resulting solution was then dispersed in 20,000 parts of water with the aid of a small quantity of powdered blood albumin. The resulting dispersion was then sprayed onto ripe Valencia oranges infested with eggs of the citrus red mite (*Paratetranychus citri*). Examination of the fruit six days later showed 80 per cent of the eggs to be unhatched as compared with a control value of only 4.5 per cent.

Example 17

Ethyl 2,4-dinitrophenyl sulfide was ball-milled with an equal weight of talc, and the resulting insecticidal dust was suspended in water with the aid of a small amount of "Multifilm" spreader and kerosene. The aqueous suspension contained 2.0 pounds of the active ingredient, 4 ounces of the spreader and one pint of kerosene per 100 gallons of water. This dispersion was applied to lemon trees infested with citrus red mite with a power sprayer. Twenty-one days after treatment, 10 leaves were picked from representative locations on each tree and were examined for live mites. It was found that each leaf bore an average of 3.08 mites per leaf. A similar examination conducted fifty-five days after treatment showed a mite count of 8.7 mites per leaf. Sec.-butyl, 2,4-dinitrophenyl sulfide was tested in the same manner and was found to give a 35-day mite count of 0.05, a 69-day count of 0.10, and a 92-day count of 1.55. On control trees the 21-day count averaged 10.6, the 35-day count averaged 15.3, and the 69-day count averaged 12.8.

The concentration in which the toxic agents of the present invention are employed in pest control compositions varies widely depending upon a number of factors, including the particular compound employed, the type of composition in which it is used, the type of organism being combatted, and the conditions under which the composition is to be used. In general, however, when employed in aqueous emulsion or suspension form as an orchard or garden spray, it is preferable that the composition contain from about 0.1 to about 5.0 per cent by weight of the active agent. Such compositions usually also comprise a small amount, e. g., 0.001 to 0.5 per cent by weight, of a wetting or dispersing agent which serves to secure homogeneous dispersion of the toxic agent in the water or other liquid vehicle and to promote good contact between the spray and the foliage or the like being treated. In other types of compositions, for example in dry dusting compositions wherein the toxic agent is mixed with an inert dry diluent, the active agent is usually employed in somewhat higher proportions, e. g., 5 to 25 per cent or even 50 per cent by weight.

Other modes of applying the principle of our invention may be employed instead of those explained, change being made as regards the methods or materials disclosed provided the steps or compositions stated by any of the following claims, or the equivalent of such stated steps or compositions, be employed.

We, therefore, particularly point out and distinctly claim as our invention:

1. A pest control composition essentially comprising an aqueous dispersion containing from about 0.1 to about 5 per cent by weight of an alkyl aryl sulfide having the general formula:

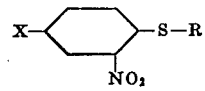

wherein R represents an alkyl group and X represents a substituent selected from the class consisting of nitro and halogen groups, and from about 0.001 to about 0.5 per cent of a dispersing agent.

2. A pest control composition essentially comprising an aqueous dispersion containing from about 0.1 to about 5 per cent by weight of an alkyl aryl sulfide having the general formula:

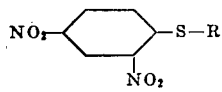

wherein R represents an alkyl group, and from about 0.001 to about 0.5 per cent of a dispersing agent.

3. A composition according to claim 2 wherein the alkyl aryl sulfide is sec.-butyl 2,4-dinitrophenyl sulfide.

4. A composition according to claim 2 wherein the alkyl aryl sulfide is ethyl 2,4-dinitrophenyl sulfide.

5. A pest control composition essentially comprising an aqueous dispersion containing from about 0.1 to about 5 per cent by weight of an alkyl aryl sulfide having the general formula:

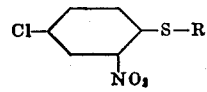

wherein R represents an alkyl group, and from about 0.001 to about 0.5 per cent of a dispersing agent.

DAVIS A. SKINNER.
ELVIN L. WAMPLER.

REFERENCES CITED

The following references are of record in the file of this patent:

UNITED STATES PATENTS

| Number | Name | Date |
|---|---|---|
| 2,213,214 | Hester | Sept. 3, 1940 |
| 2,489,935 | Searle | Nov. 29, 1949 |

OTHER REFERENCES

Questel et al.: U. S. D. A. Bur. of Ent. and Plant Quar. Bull. entitled, "Laboratory Tests of Toxicity of Some Organic Compounds to the Corn Borer," E–620, May 1944, pp. 1–4.

Blanksma: Recueil des travaux chim. des Pays-Bas, vol. 20, page 404.

J. Am. Chem. Soc., vol. 54, pages 1985–1987 (1932).

Fink et al.: U. S. D. A. Bureau of Ent. and Plant Quarantine Bull. E–425, March 1938, page 28.

Roark et al.: U. S. D. A. Bur. of Ent. and Plant Quarantine. Bull. E–344 entitled "A List of Organic Sulphur Compounds," May 1935, page 18.

Certificate of Correction

Patent No. 2,557,520                                          June 19, 1951

DAVIS A. SKINNER ET AL.

It is hereby certified that error appears in the printed specification of the above numbered patent requiring correction as follows:

Column 5, line 54, for "spreading" read *sticking*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*